Figures 1, 2:
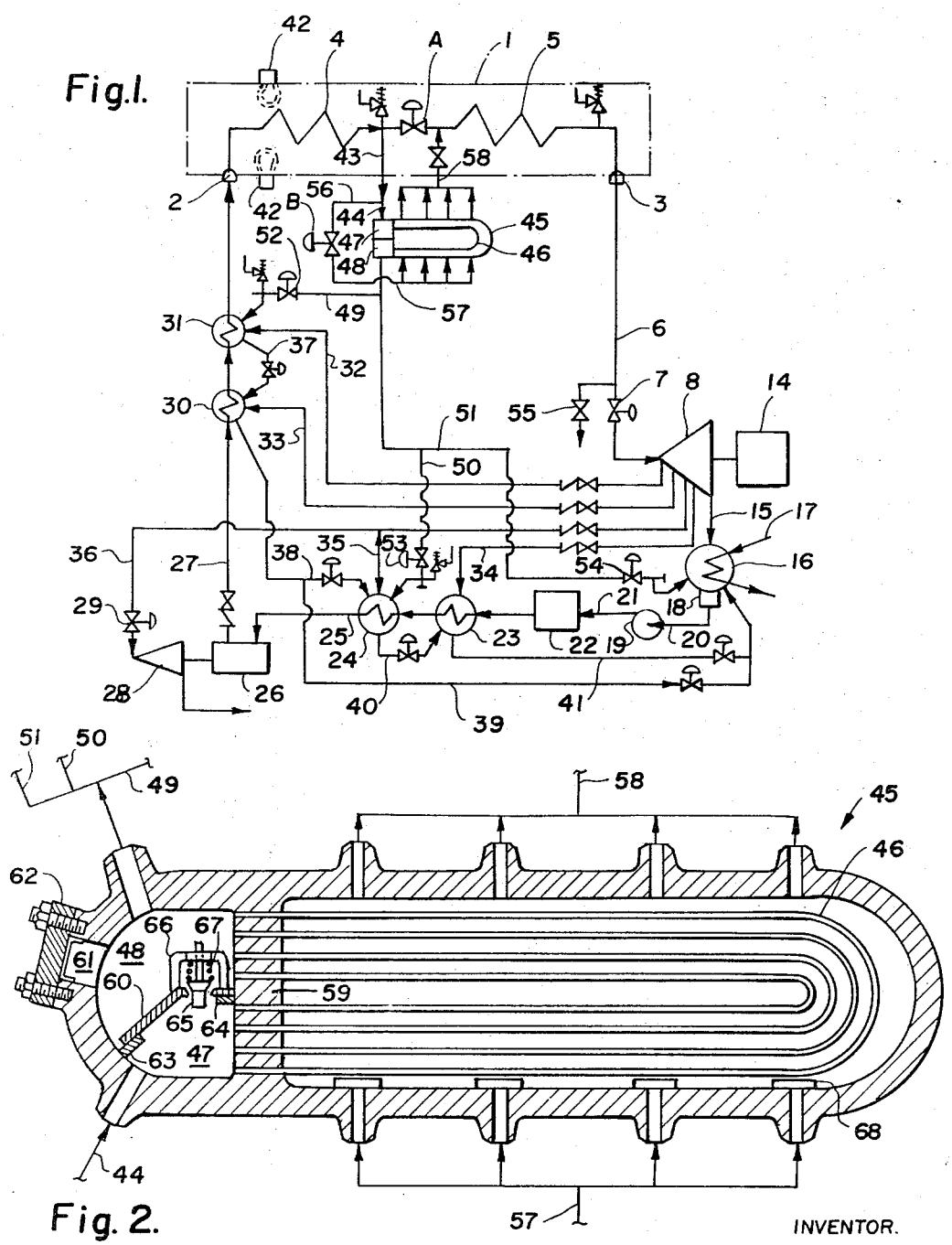

April 18, 1967  C. STROHMEYER, JR  3,314,237

STARTUP SYSTEM FOR A ONCE-THROUGH STEAM GENERATOR

Filed May 25, 1966

INVENTOR.
CHARLES STROHMEYER, Jr.
BY
his ATTORNEY

United States Patent Office 3,314,237
Patented Apr. 18, 1967

3,314,237
STARTUP SYSTEM FOR A ONCE-THROUGH
STEAM GENERATOR
Charles Strohmeyer, Jr., Wyomissing, Pa., assignor to
Electrodyne Research Corporation, Reading, Pa.
Filed May 25, 1966, Ser. No. 552,896
4 Claims. (Cl. 60—105)

This invention relates to steam-electric generating units having a steam generator of the once-through type and wherein it is desired to coordinate the startup of the steam generator to best suit the requirements of the turbine generator. This invention is a continuation-in-part of U.S. patent application Ser. No. 452,143, filed Apr. 30, 1965.

According to U.S. patent application Ser. No. 452,143, filed Apr. 30, 1965, there is provided a startup heat exchanger for a steam-electric generating plant, said plant comprising a steam generator and turbine generator, said turbine generator having a high pressure turbine, said steam generator having a feedwater inlet, steam generating and superheating heat absorption conduits in series, a superheater steam outlet, fluid conduit means interconnecting said feedwater inlet, heat absorption conduits, superheater steam outlet and high pressure turbine, throttling means for reducing fluid pressure intermediately between portions of said heat absorption conduits between said feedwater inlet and said superheater steam outlet, the portion of said heat absorption conduits downstream of said throttling means being operated during startup of said plant at a lower pressure than is in the portion of said heat absorption conduits upstream of said throttling means, a startup bypass conduit connected to said upstream portion and downstream of at least a portion of said heat absorption conduits which are directly connected to said feedwater inlet, said bypass conduit including means to flow fluid away from said upstream portion and for establishing circulation through at least a portion of said upstream portion independently of flow through said downstream portion during startup of said plant, thereby providing an independent circulation circuit including said bypass conduit and at least a portion of said upstream portion of said heat absorption conduits, said startup heat exchanger being located in the high temperature portion of said circulation circuit, said throttling means including conduit means for passing fluid from said upstream portion through a separate circuit in said startup heat exchanger after throttling and pressure reduction and for discharging the effluent from said separate circuit to said downstream portion, said startup heat exchanger being adapted to transfer heat in the fluid from said circulation circuit to said fluid passing through said separate circuit after pressure reduction.

An object of this invention is to provide a means for economically constructing said startup heat exchanger, wherein said startup heat exchanger is of the closed circuit multiple tube and shell type, one circuit passing through the heat exchanger multiple tubes and another circuit passing through the heat exchanger tube shell.

Another object is to provide a means to bypass fluid around said multiple tubes.

A further object is to provide a means for establishing flow through the heat exchanger shell transverse to the long axis of the multiple tubes.

A still further object is to integrate the circuit passing through the heat exchanger multiple tubes with the unit feedwater cycle.

The invention will be described in detail with reference to the accompanying drawings wherein:

FIG. 1 is a schematic diagram of the steam and water cycle for a steam-electric generating plant embodying the said startup heat exchanger improvements, and FIG. 2 is a cross section detail of said startup heat exchanger.

In FIG. 1, steam generator 1 is provided with feedwater inlet 2 and superheater outlet 3. Fluid passes from 2 through heat absorption conduits 4, through valve A, through heat absorption conduits 5 to superheater outlet 3. Conduits 4 may comprise generating circuits only or be combined with superheating circuits. Conduits 5 may comprise superheating circuits only or be combined with generating circuits.

During unit operation in the full load range, pressure drop across valve A is to be maintained at a minimum value to avoid excessive pumping power. Essentially all of the flow entering feedwater inlet 2 passes out through superheater outlet 3 in a single pass through conduits 4 and 5. Steam from superheater outlet 3 passes through conduit 6 to steam admission valve/s 7 which control flow of steam to turbine 8. Turbine 8 includes a high pressure portion directly connected to valve/s 7.

A steam reheater (not shown) may be interposed intermediately in the turbine 8 steam flow path.

Turbine 8 is connected through shaft means to electric generator 14. Steam from turbine 8 exhausts through conduit 15 to steam condenser 16. Cooling water passing through conduits 17 condenses the exhaust steam which collects as condensate in hotwell 18.

Condensate pump 19 takes suction from hotwell 18 through conduit 20 and discharges through conduit 21 to water purification equipment 22 and from there to low pressure feedwater heaters 23 and 24 and conduit 25 to feedpump 26. Feedpump 26 raises the discharge pressure to the working level of the steam generator.

Flow of water to the steam generator through conduit 27 is regulated by control of turbine drive 28 speed. Turbine drive 28 is equipped with a speed governor (not shown) which regulates flow of steam through control valve 29. Conduit 27 connects to high pressure feedwater heaters 30 and 31 in series to feedwater inlet 2.

Turbine 8 extraction steam is fed to high pressure feedwater heaters 31 and 30 through conduits 32 and 33 respectively, to low pressure heaters 23 and 24 through conduits 34 and 35 respectively and to turbine drive 28 through conduit 36.

Heater 31 shell drains through conduit 37 to heater 30 shell. Heater 30 shell drains through conduit 38 to heater 24 shell or alternatively through conduit 39 to condenser 16. Heater 24 shell drains through conduit 40 to heater 23 shell. Heater 23 shell drains through conduit 41 to condenser 16.

Steam generator 1 is provided with combustion means. Burners 42 fire oil or coal in a furnace (not shown) which supplies heat to heat absorption conduits 4 and 5. Fluid enthalpy progressively increases from the feedwater inlet 2 to superheater outlet 3.

During startup, a minimum amount of fluid is circulated from the feedwater inlet 2 through conduits 4, through conduits 43 and 44, through startup heat exchanger 45 tube bundle 46. Tube bundle 46 connects to inlet supply manifold 47 and outlet collection manifold 48. Collection manifold 48 discharges through conduit 49 to high pressure heater 31 shell, through conduit 50 to low pressure heater 24 shell or through conduit 51 to condenser 16. Valves 52, 53 and 54 control the flow of fluid in conduits 49, 50 and 51, respectively. Coordinated regulation of flow through valves 52, 53 and 54 controls pressure in conduits 4. Pressure control means are not shown. Fluid passing through valves 52 and 53 returns to the condenser hotwell via the heater shell drain conduits 37, 39, 40 and 41. From the condenser hotwell the fluid is returned to feedwater inlet 2 via condensate pump 19, water purification equipment 22, feed pump 26. Flow is apportioned among valves 52, 53 and 54 in accordance with cycle heat balance requirements.

The feedpump is the fluid circulator, and establishes flow in conduits 4 utilizing superheater bypass 43 at times when flow through conduits 5 is below the minimum quantity required to establish adequate distribution through conduits 4. Conduits 4 are associated with the combustion furnace (not shown) and are exposed to burners 42.

Flow is proportioned through valves 52, 53 and 54 according to the heat content of the fluid in conduit 43 and the heat input to the furnace from burners 42. When the fluid circulating through conduits 4 and 43 is cold, circulation is through valve 53 to low pressure heater 24. This raises the temperature of the fluid in conduit 25 to the boiler feed pump suction as temperature in conduit 43 increases. Rate of temperature rise for any given burner 42 firing rate may be controlled by diverting part of the circulating flow through valve 54 to the condenser. Thus, less heat becomes available for feedwater heating. As the temperature rises in conduits 43 and 25, a limit is established for maximum temperature in conduit 25 such as 300° F. Valve 53 is throttled to maintain the desired temperature in conduit 25 and the surplus flow is passed through valve 54.

If it is desired to increase the temperature of the fluid entering feedwater inlet 2 above 300° F., fluid is discharged through valve 52 to high pressure heater 31 shell. A proportionate amount of flow is diverted from valve 54. There will be a maximum allowable temperature to the feedwater inlet 2 set by the design pressure of high pressure heater 31 shell. When this limit is reached, valve 52 must be throttled and the surplus flow passed through valve 54 to the condenser. The control of valves 52, 53 and 54 is coordinated to regulate pressure in conduits 4 as well as to regulate fluid pressures in the shells of heaters 24 and 31. Regulations of heater shell pressure also regulates the fluid temperatures in conduit 25 and at feedwater inlet 2.

Raising the temperature of the fluid at the feedwater inlet 2 increases the heat content at the outlet of conduits 4 for any given firing rate of burners 42 and helps raise the heat level to the working level of the steam generator.

It will be noted that when fluid is passed through valve 53 to heater 24 shell, the flashed steam may pass through conduits 35 and 36 in series to turbine driver 28 to power feed pump 26. When the unit is cold, there is no steam available to drive turbine 28 and feedpump 26. In order to establish circulation through conduits 4 at this time, a motor driven pump in parallel with pump 26 (not shown) is used. The motor driven pump discharge pressure may be reduced considerable below that required for pump 26. The discharge pressure for the motor driven pump need only be sufficient to suppress vapor formation in conduits 4 until the time that there is sufficient steam available from heater 24 shell to drive turbine 28 and pump 26 raising the pressure in conduits 4 to the working pressure of the unit.

Fluid flowing through valves 52 and 53 to heater 24 and 31 shells may be returned to the condenser hotwell 18 through the drain conduits 37, 38 or 39, 40 and 41. The control valves in the drain conduits regulate water level in the respective upstream heater shells at a present point.

When starting the unit, prior to lighting burners 42, circulation is established in conduits 4 through conduits 43, 44, tube bundle 46, conduit 50, heater 24 shell, conduit 40, heater 23 shell, conduit 41 to condenser 16 or alternatively through conduit 51 to condenser 16, hotwell 18, condensate pump 19, water purification equipment 22, low pressure heaters 23 and 24, through conduit 25 to feedpump 26, through conduit 27 to high pressure heaters 30 and 31 to feedwater inlet 2. The condensate pump 18 and feedpump 26 are circulators. In the case of a cold unit, the motor driven feed pump (not shown) in parallel with feedpump 26 is first used. The conduits 4 are pressurized and valves 53 and 54 regulate pressure in the conduits 4. When the motor driven pump is used at constant speed valves 53 and 54 may regulate flow through conduits 4 until there is sufficient auxiliary steam available to drive pump 26 at which time pump speed and flow quantity is regulated by steam admission valve 29.

Burners 42 are fired. Fluid exiting through conduit 43 gradually rises in temperature. Fluid passing through valve 53 raises the temperature of the fluid in conduit 25. Fluid passing through valves 53 and 54 ultimately is discharged to condenser 16. As liquid is collected and pumped through water purification equipment 22, the impurities are removed before the fluid is returned to the feedwater inlet 2 via the feedpump.

When sufficient steam is available in heater 24 shell, pump 26 is placed in service and the pressure raised in conduits 4 to the working pressure of the unit.

Temperature in conduit 43 continues to rise, pressure in heater 24 shell is controlled to a preset limit by throttling valve 53. Flow is then diverted to heater 31 shell through valve 52. When heater 31 shell pressure reaches a preset limit, valve 52 is throttled to prevent pressure rise above said limit. Valve 54 passes surplus flow which cannot be utilized in heaters 24 and 31.

When the cycle is clean and sufficient heat is available in conduit 43, valve B is opened partially to admit fluid to conduits 5 to warm up steam lead 6. Valve 55 is opened to permit fluid to flow up to steam admission control valve/s 7. Valve 55 may discharge to waste during the warm up period.

Conduit 56 connects conduit 43 to valve B. Valve B discharges through conduit 57 to the lower side of heat exchanger 45 shell. The shell horizontal length is greater than the shell diameter and conduit 57 is divided into multiple branches connecting to nozzles along the shell length. The fluid entering heater 45 shell passes up vertically among multiple tubes 46 and discharges from the top of horizontal heater 45 shell through multiple nozzles to conduit 58. Conduit 58 connects to conduits 5 downstream of valve A and upstream of at least a portion of conduits 5 which are connected to superheater outlet 3.

Firing rate and fluid flow through valves 52, 53 and 54 is coordinated to maintain adequate temperature in conduit 43.

Partial opening of valve B causes a throttling action across the valve seat. This reduces the downstream pressure in conduit 57 below the upstream pressure in conduit 56. The pressure reduction is accompanied by a substantial temperature reduction. Thus, the temperature of the high pressure fluid passing through multiple tubes 46 is substantially higher than the temperature of the low pressure fluid discharging from valve B, through conduit 57 to heat exchanger 45 shell and over multiple tubes 46. This temperature differential exists even though the heat content of the fluid entering multiple tubes 46 is the same as the heat content of the fluid entering the heater shell through conduit 57. The temperature differential exists by virtue of the pressure reduction of fluid across valve B. Thus, heat transfer will occur between the fluid passing through the tubes and the fluid passing through the shell. The heat content of the fluid exiting from collection manifold 48 will be reduced below the supply manifold 47 condition. The heat content of the fluid exiting from the heat exchanger 45 shell to conduit 58 will be increased above the condition in the supply conduit 57.

The heat transfer between the two circuits is desirable as it enables the heat absorbed in conduits 4 to be apportioned between the flow to the feedwater cycle through valves 52, 53 and 54 and the flow to conduits 5 through valve B. During startup a substantial amount of flow is required to be circulated through conduits 4 which are directly exposed to the combustion fires from burners 42. Fluid flow through conduits 5 may range from zero to the full flow through the conduits 4 during the startup process. When flow through the conduits 5 is substantially less than the flow through conduits 4, it is difficult to apportion the heat input to conduits 4 and 5 without heat exchanger 45.

As a result of heat exchanger 45 the condition of the fluid in conduit 43 may be substantially below saturation at times when fluid flow through valve B is only a portion of the total fluid flow through conduit 43 and at the same time as a result of heat transfer the fluid entering conduits 5, through conduit 58, may be at approximately saturation conditions. Thus, a reasonably dry source of steam is available to conduits 5 after pressure reduction through valve B during startup at times when the condition of the fluid exiting from conduits 4 would produce a substantially wet condition if flow were passed from conduits 4 to conduits 5 directly through valve A.

For example, if the fluid pressure upstream of valves A and B is 3500 p.s.i.g. and the fluid temperature is 700° F., reducing pressure in conduit 57 to 500 p.s.i.g. will reduce fluid temperature to 480° F. This will produce a temperature differential of 220° F. across the heat exchanger multiple tubes 46. Fluid at 1800 p.s.i.g. and 700 British thermal units per pound reduced in pressure across valve B to 500 p.s.i.g. would provide a temperature differential of approximately 155° F. across multiple tubes 46.

When the conduit 6 is properly heated, steam may be admitted to turbine 8 through steam admission valve/s 7 to roll turbine 8 up to speed. When the turbine generator unit 8 and 14 is at synchronous speed, the unit is synchronized with the system and the generator output is increased to a predetermined minimum value by further opening of valve B. Valve 55 may be closed. Firing of burners 42 is increased. As a result of the inclusion of heat exchanger 45, firing rate increase can be linear with increase in steam flow through conduits 5 up to the point where flow through conduits 5 equals the flow through conduits 4. As more fluid is passed through valve B, less heat transfer is required in heat exchanger 45 per pound of fluid flowing through valve B as a result of firing rate increase.

As load is increased by means of flow through valve B, pressure in conduits 5 can also be increased, coordinated with requirements in heat exchanger 45. Pressure rise in conduits 5 is controlled by coordination of valve/s 7 opening with valve B opening. Valve A opening is coordinated with valve B opening to regulate fluid flow to and pressure in conduits 5. Eventually as load is further increased valve A will be fully open. Flow through valve B can be discontinued when the flow through conduits 5 equals the flow through conduits 4.

The configuration of circuits shown on FIG. 1 is not limiting with respect to the present invention. For example valve 53 could discharge to a direct contact de-aerating type feedwater heater in the condensate cycle upstream of the feedwater pump.

FIGURE 2 shows a cross section detail of heat exchanger 45. The heat exchanger is arranged horizontally as shown. The tube shell and tube sheet 59 are cylindrical. The end of the tube shell is eliptical. The distribution manifold 47 and collection manifold 48 are built into a cylindrical head, the end of which is eliptical. The manifolds 47 and 48 are separated by plate 60. Manhole 61 and manhole cover 62 provide access to the tube sheet. Plate 60 is bolted to lugs 63 and 64 connecting to the head and tube sheet 59 respectively. Plate 60 is provided with a valve 65 which is guided by yoke 66 and compression loaded by spring 67. The purpose of valve 65 is to provide a bypass across multiple U tubes 46 at times when fluid flow through conduit 44 is substantially in excess of fluid flow through valve B. Heat exchange requirements at this time are minimal. The bypass flow permits the total cross section area of the multiple tube bundle to be reduced, reducing the cost of the heat exchanger. Thus, the flow through the multiple tubes 46 is designed for only a portion of the minimum fluid flowing through conduits 4 at times when fluid flowing through valve B and A are minimum or zero. The spring 67 compression on valve 65 controls maximum pressure differential between manifolds 47 and 48 which also regulates maximum velocity through multiple tubes 46.

The tube shell inlet nozzles connecting to conduit 57 are spaced uniformly along the horizontal length of the shell on the bottom side. Thus the entering fluid may flow up transversely across the multiple tube bundle 46. The direction of flow is through the greatest cross section area of the tube shell assuring minimum fluid velocities between the shell and the tubes. The flow downstream of valve B is reduced in pressure, increasinng specific volume of the fluid and velocity per unit of flow. Also, the fluid entering the shell through conduit 57 contains considerable moisture. Baffles 68 are provided to prevent moisture impingement against multiple tubes 46. Multiple discharge nozzles connecting to conduit 58 are provided at the top of the heater shell to minimize the required internal horizontal steam passageways. The arrangement described above permits the heat exchanger diameter to be reduced to a minimum. Since the vessel is designed for the full working pressure of the boiler, reduced diameter reduces shell wall thickness and cost of the vessel. Thermal stresses in the shell are also reduced by minimized wall thickness.

Thus, it will be seen that I have provided an efficient embodiment of the invention, whereby a means is provided for economically constructing a startup heat exchanger for a once-through boiler. In addition a fluid bypass is provided to limit excess flow through the multiple tubes of said startup heat exchanger. Transverse flow in the shell across the tube bundle minimizes fluid velocity in the low pressure circuit, reducing the required shell diameter and wall thickness. The multiple tube discharge from the heat exchanger is integrated with the unit feedwater cycle by means of separate throttling means discharging alternatively to different portions of the feedwater cycle.

While I have illustrated and described several embodiments of my invention, it will be understood that these are by way of illustration only, and that various changes and modifications may be made within the contemplation of my invention and within the scope of the following claims.

I claim:

1. A high pressure steam-electric generating plant having a steam generator comprising a feedwater inlet and superheater steam outlet and heat absorption circuits connected by first fluid conduit means there between, a startup bypass fluid conduit connected to said first conduit means between portions of said heat absorption circuits adapted to convey fluid away from said first conduit means, flow control means for isolating and throttling fluid between a first portion of said heat absorption circuits which are directly connected to said feedwater inlet including said bypass conduit and a remaining portion of said heat absorption circuits which are directly connected to said superheater steam outlet, a heat exchanger having a first fluid circuit connected serially in said startup by-pass conduit, a second fluid circuit in said heat exchanger, said flow control means including means for throttling and conducting coolant fluid from said first portion of said heat absorption circuits to said second fluid circuit and from thense to said remaining portion of said heat absorption circuits, said heat exchanger being of the closed circuit multiple tube and shell type, said multiple tubes being connected to inlet and outlet supply and collection manifolds and comprising said heat exchanger first fluid circuit, said tube encased in said shell, space between said tubes and shell comprising said second circuit, said heat exchanger having means to transfer heat in the fluid in said heat exchanger first fluid circuit to the fluid in said second fluid circuit at least at times when fluid flowing in said bypass conduit is at pressure in excess of 1800 pounds per square inch and its enthalpy is in excess of 700 British thermal units per pound of flow and the fluid flowing through said second fluid circuit is throttled to a pressure lower than the fluid pressure which exists in said multiple tube portion of said bypass conduit.

2. A high pressure steam-electric generating plant as recited in claim 1 including conduit and flow control means to bypass a portion of the fluid passing through said startup bypass conduit around said multiple tubes at least at times when flow quantities through said startup bypass conduit are maximum and flow quantities through said second fluid circuit are minimum.

3. A high pressure steam-electric generating plant as recited in claim 1 wherein said heat exchanger multiple tubes are arranged horizontally, the length of said multiple tubes and said encasing shell being of substantially greater dimension than is the transverse dimension across the multiple tube parallel grouping and encasing shell, and wherein said means for conducting coolant fluid from said first portion of said heat absorption circuits to said second fluid circuit includes multiple nozzle at the bottom of said heat exchanger shell and multiple nozzles at the top of said heat exchanger shell for conducting said fluid to said remaining portion of said heat absorption circuits, said bottom and top nozzle being arranged so that flow through said second circuit is substantially parallel and transverse across said multiple tubes, thereby increasing cross section area of the fluid distribution path around the tubes and reducing the dimension of the shell transverse to the axis of said multiple tubes and resultant required wall thickness of said shell.

4. A high pressure steam-electric generating plant as recited in claim 1 including a steam turbine driver for powering electric generating means, conduit means connecting said superheater steam outlet and said turbine driver for flowing steam to said turbine driver, a turbine steam outlet exhausting to a condensing type heat sump, means for collecting condensed steam in said heat sump and for pumping and conducting said collected condensed steam to a regenerative feedwater cycle supplying feedwater to said steam generator feedwater inlet, said regenerative feedwater cycle including feedwater heaters receiving extraction steam at various pressure levels from said turbine driver, additional pumping means intermediately located in said regenerative feedwater cycle for raising said feedwater pressure to the working level of said steam generator, said startup bypass conduit including means downstream of said heat exchanger multiple tubes to throttle and selectively flow fluid to each of said heat sump and at least one of said feedwater heaters in said regenerative feedwater cycle.

No references cited

MARTIN P. SCHWADRON, *Primary Examiner.*

ROBERT R. BUNEVICH, *Examiner.*